UNITED STATES PATENT OFFICE.

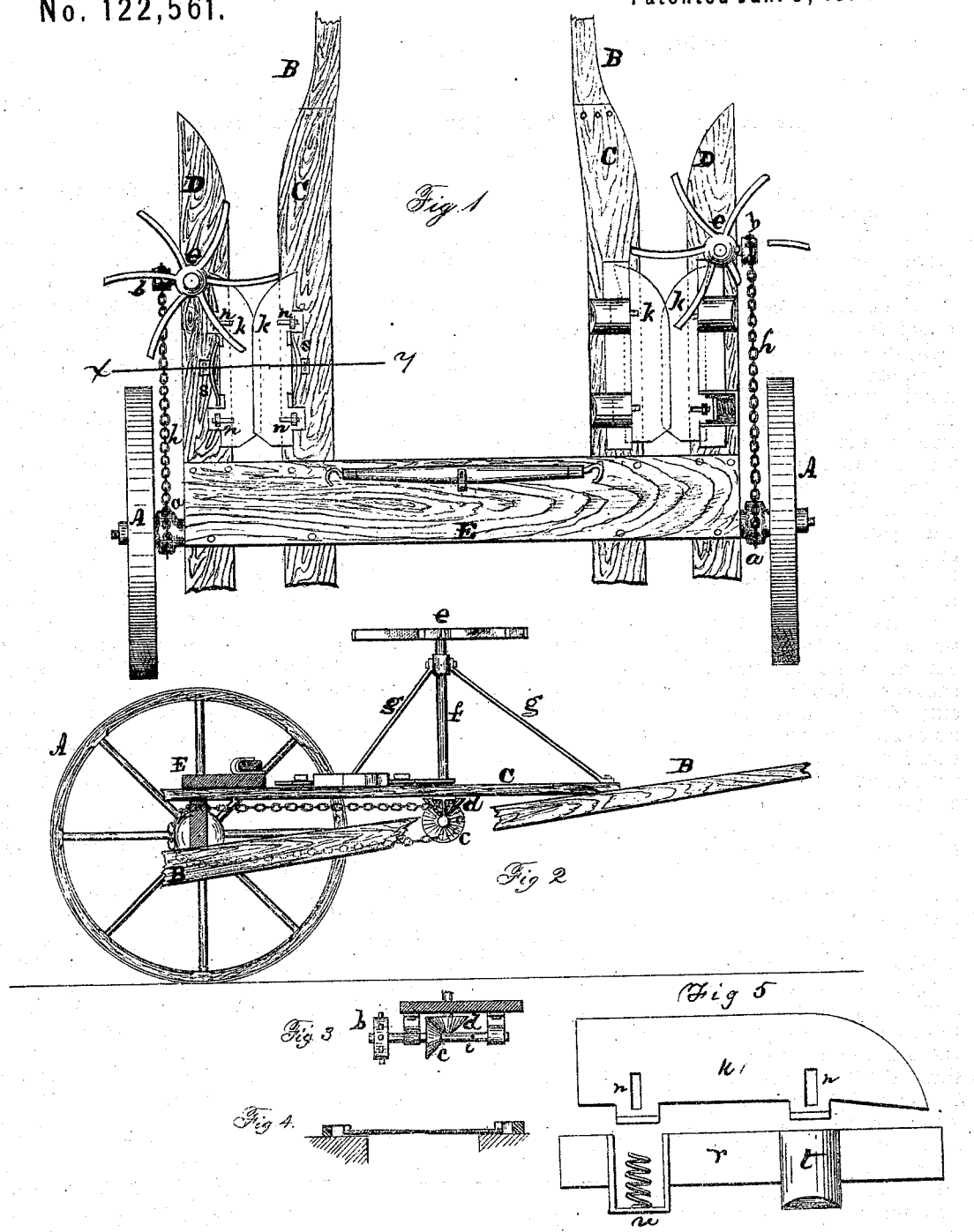

JOHN BURKE, OF SYCAMORE, ILLINOIS.

IMPROVEMENT IN CORN-HARVESTERS.

Specification forming part of Letters Patent No. 122,561, dated January 9, 1872.

SPECIFICATION.

I, JOHN BURKE, of Sycamore, in the county of De Kalb and State of Illinois, have invented certain new and useful Improvements in Corn-Harvesters, of which the following is a full description, reference being had to the accompanying drawing making a part of this specification, in which—

Figure 1 is a plan view; Fig. 2, a longitudinal vertical section; Fig. 3, a detail, showing the gearing which drives the reel; Fig. 4, a section on line $x\,y$ of Fig. 1; Fig. 5, an enlarged view of one knife, also showing a second mode of arranging springs behind it.

My invention consists in constructing a corn-harvester with knives arranged so as to cut the stalks by simply pressing on opposite sides thereof as the machine is drawn along, as hereinafter explained.

In the drawing, A represents the wheels, about two and a half feet in diameter, as shown, which run on an ordinary axle. B are the shafts, the rear ends of which are secured to the under side of the axle at such an angle as may be required to bring their forward ends in the proper position. C D are bars, the rear ends of which are bolted to the top of the axle. The front ends of the two bars C are secured to the shafts B, while the bars D may be braced from the axle by rods secured suitably. The front ends of both C and D are curved, (see Fig. 1,) and serve the purpose of gathering the standing corn and directing it to the knives. $e$ is a reel upon the top of the upright shaft $f$, and about eighteen inches above the bars D, which supports the stalks above the knives. The reel is driven by a chain, $h$, which runs over a ratchet-wheel, $a$, on the hub of the wheel A, and over another ratchet-wheel, $b$, upon the end of a short shaft, $i$, supported in bearings beneath D, on which short shaft $i$ is a bevel gear-wheel which drives the bevel gear-wheel $d$ upon the lower end of $f$. (See Fig. 3.) The shaft $f$ is supported in the usual manner, and may be braced with rods $g$. The knives $k$ are about eighteen inches long, about three-eighths of an inch thick at the back. Their form is shown in the drawing. They are not rigidly secured to the machine, but each is provided with two slots, $n$, one near each end of the knife. The knives rest on the bars C D, and bolts with large heads pass through the slots $n$ and are secured to the bars C D in such a position that the knives can move laterally, and the slots are to be of such width relatively to the bolts that the knives may have such lateral movement at either end alone, or may move away from each other at one end, and, at the same time, approach each other at the other end. The knives are so arranged that their edges overlap each other a little, and are held together by a spring, $s$, back of each knife, as shown on the left side of Fig. 1; and the back of the knives may have lips to furnish broad bearings for the ends of the springs to rest against. The springs may be secured to the bars and made adjustable in any suitable manner. E is a board or plank, above and bolted to the bars C D. If desired, an apron or platform may be hinged behind the machine to the bars C D or plank E to receive the cut stalks, and the platform may be so constructed that the operator can let the rear fall to the ground at suitable intervals to discharge the cut stalks upon the ground.

The machine is to be drawn by a single horse. The distance between the two sets of knives must correspond with the distance between two rows of corn, two rows being cut at the same time.

In operation the stalks are gathered and brought to the knives by the bars C D and reel $e$; and as the stalks pass in between the knives they will be forced apart somewhat at their front ends, while the stalks will be forced along, or rather they will be held upright, while the knives will be drawn forward and the stalks will be uniformly severed, and clogging will be prevented.

Another method of placing springs behind the knives is shown on the right of Fig. 1 and in Fig. 5. In this case the slots and bolts are used as before. Cut over the back part of the knife, and partly let into the wood, is a casting, the plate part $r$ of which forms a guide for the knife, while the parts $t\,u$ form boxes, within which are spiral springs, taking the place of the springs $s$ before mentioned, one of which boxes is shown open.

Knives having any suitable kind of an edge may be used. Guards may be placed upon the machine to prevent the cut stalks from falling upon the wheels.

I am aware that revolving and pivoted knives or cutters have been used in a corn-harvester, and I do not claim such movable knives or cutters.

What I claim as new, and desire to secure by Letters Patent, is as follows:

A corn-harvester, having its cutting-knives $k\ k$ made with their front ends curved outward and their straight cutting-edges overlapping and having no pivotal connection to the frame, but held together by springs, as described, whereby the stalks are cut by a steady and constant pressure of the knives on opposite sides of the stalks as the machine is drawn along, as set forth.

JOHN BURKE.

Witnesses:
 JNO. K. MCKINNON,
 E. A. WEST.

(75)